(12) United States Patent
Saini et al.

(10) Patent No.: US 11,790,379 B2
(45) Date of Patent: Oct. 17, 2023

(54) BAYESIAN ESTIMATION OF THE EFFECT OF AGGREGATE ADVERTISING ON WEB METRICS

(71) Applicant: ADOBE INC., San Jose, CA (US)

(72) Inventors: Shiv Kumar Saini, Karnataka (IN); Ritwik Sinha, Cupertino, CA (US); Moumita Sinha, Cupertino, CA (US); David Arbour, San Jose, CA (US)

(73) Assignee: ADOBE, INC., San Jose, CA (US)

( * ) Notice: Subject to any disclaimer, the term of this patent is extended or adjusted under 35 U.S.C. 154(b) by 102 days.

(21) Appl. No.: 17/004,377

(22) Filed: Aug. 27, 2020

(65) Prior Publication Data

US 2022/0067753 A1 Mar. 3, 2022

(51) Int. Cl.
*G06Q 30/0201* (2023.01)
*G06Q 30/0204* (2023.01)
(Continued)

(52) U.S. Cl.
CPC .......... *G06Q 30/0201* (2013.01); *G06N 7/01* (2023.01); *G06Q 30/0205* (2013.01);
(Continued)

(58) Field of Classification Search
CPC .......... G06Q 30/0201; G06Q 30/0205; H04L 67/22; H04N 21/812; G06N 7/005
See application file for complete search history.

(56) References Cited

U.S. PATENT DOCUMENTS

2003/0140012 A1* 7/2003 Harvey .............. G06Q 30/0278
705/306
2006/0041480 A1* 2/2006 Briggs ............... G06Q 30/0243
705/14.48
(Continued)

FOREIGN PATENT DOCUMENTS

CN 109767061 A * 5/2019 ............. G06Q 10/06

OTHER PUBLICATIONS

"Correlated Online Behaviors can lead to Overstimates of the Effects of Advertising", by Randall A. Lewis, Justin M. Rao and David Relley, The International World Wide Web Conference Committee (IW3C2). Apr. 1, 2011. (Year: 2011).*
(Continued)

*Primary Examiner* — Pan G Choy
(74) *Attorney, Agent, or Firm* — F. CHAU & ASSOCIATES, LLC

(57) ABSTRACT

A method, apparatus, and non-transitory computer readable medium for data analytics are described. Embodiments of the method, apparatus, and non-transitory computer readable medium include monitoring online activity corresponding to a plurality of users; receiving aggregate marketing data for a marketing activity; identifying online activity data for a time period corresponding to the marketing activity based on the monitoring; generating a regression model based on the aggregate marketing data and the online activity data using Bayesian regression, wherein the regression model represents a relationship between the marketing activity and the online activity, comprises a time effect
(Continued)

coefficient, and is based on a prior distribution of the time effect coefficient that decays to zero as time increases; and estimating a treatment effect for the marketing activity on the online activity based on the regression model, wherein the treatment effect comprises a rate of effect decay.

13 Claims, 7 Drawing Sheets

(51) Int. Cl.
    *H04N 21/81* (2011.01)
    *G06Q 30/0242* (2023.01)
    *H04L 67/50* (2022.01)
    *G06N 7/01* (2023.01)
(52) U.S. Cl.
    CPC ....... *G06Q 30/0242* (2013.01); *H04L 67/535* (2022.05); *H04N 21/812* (2013.01)

(56) References Cited

U.S. PATENT DOCUMENTS

| | | | | |
|---|---|---|---|---|
| 2008/0319829 | A1* | 12/2008 | Hunt | G06Q 30/0201 |
| | | | | 705/7.29 |
| 2009/0006188 | A1* | 1/2009 | Guo | G06Q 30/02 |
| | | | | 705/14.27 |
| 2011/0313900 | A1* | 12/2011 | Falkenborg | G06Q 40/025 |
| | | | | 705/30 |
| 2013/0246086 | A1* | 9/2013 | Mun | G16H 70/20 |
| | | | | 705/2 |
| 2015/0081417 | A1* | 3/2015 | Golden | G06Q 30/0269 |
| | | | | 705/14.41 |
| 2018/0084308 | A1* | 3/2018 | Lopatecki | H04H 60/82 |
| 2018/0189809 | A1* | 7/2018 | Jeswani | G06Q 40/12 |
| 2019/0182059 | A1* | 6/2019 | Abdou | H04L 51/52 |
| 2019/0370849 | A1* | 12/2019 | Abraham | G06Q 30/0242 |
| 2020/0401122 | A1* | 12/2020 | Shimizu | H05K 13/0812 |
| 2021/0374582 | A1* | 12/2021 | Tristan | G06N 20/00 |

OTHER PUBLICATIONS

"Correlated online behaviors can lead to overestimates of the effects of advertising", by Randall A. Lewis, Justin M. Rao, and David H. Relley, Yahoo! Research, ResearcGate, Jan. 2011. (Year: 2011).*
"Display Advertising with Real-Time Bidding (RTB) and Behavioral Targeting", by Jun Wang, Weinan Zhang, and Shuai Yuan, Jul. 18, 2017. (Year: 2017).*
• "Analyzing the effect of offline media on online conversion actions", by Didier Nibbering, Flavius Frasincar, and Damir Vandic, Econometric Institute, Erasmus University Rotterdam, Netherlands. International Journal of Web Engineering and Technology, Jan. 2017. (Year: 2017).*
"EMarketer Releases New Global Media Ad Spending Estimates"; found on internet at: https://www.emarketer.com/content/emarketer-total-media-ad-spending-worldwide-will-rise-7-4-in-2018.
"Digital Ad Spending to Surpass TV Next Year"; found on the internet at: http://www.emarketer.com/Article/Digital-Ad-Spending-Surpass-TV-Next-Year/1013671.
"2014 Mobile Behavior Report"; found on the internet at: https://www.salesforce.com/blog/2014/02/mobile-behavior-report.html.
"Even During TV Time, Digital Devices Play Prominent Role"; found on the internet at: http://www.emarketer.com/Article/Even-During-TV-Time-Digital-Devices-Play-ProminentRole/1013997.
"ABC Study Makes the Best Case Yet That TV Advertising is Still Superior to Digital"; found on the internet at: http://www.adweek.com/news/television/abc-study-makes-best-case-yet-tv-advertising-stillsuperior-digital-171510.
Nichols, "Advertising Analytics 2.0", 8 pages; found on the internet at the link: http://newmediahistory.pbworks.com/w/file/fetch/88198598/Advertising%20Analytics%202.0%20-%20Harvard%20Business%20Review.pdf.
https://www.nielsen.com/us/en/solutions/capabilities/local-tv-measurement/.
"Beware of ads that use inaudible sound to link your phone, TV, tablet, and PC"; found on the internet at: https://arstechnica.com/tech-policy/2015/11/beware-of-ads-that-use-inaudible-sound-to-link-your-phone-tv-tablet-and-pc/.
Tellis, Gerard J. "Advertising exposure, loyalty, and brand purchase: A two-stage model of choice." Journal of marketing research (1988): 134-144.
Deighton, John, Caroline M. Henderson, and Scott A. Neslin. "The effects of advertising on brand switching and repeat purchasing." Journal of marketing research (1994): 28-43.
Lin, Jhih-Syuan, and Chang-Hoan Cho. "Antecedents and consequences of cross-media usage: A study of a TV program's official web site." Journal of Broadcasting & Electronic Media 54.2 (2010): 316-336.
Kitts, Brendan, et al. "Can Television Advertising Impact be Measured on the Web? Web Spike Response as a Possible Conversion Tracking System for Television." Proceedings of the Eighth International Workshop on Data Mining for Online Advertising. ACM, 2014.
Shapiro, Bradley, Günter J. Hitsch, and Anna Tuchman. "Generalizable and robust TV advertising effects." Available at SSRN 3273476 (2019).
Jin, Yuxue, Yueqing Wang, Yunting Sun, David Chan, and Jim Koehler. "Bayesian Methods for Media Mix Modeling with Carryover and Shape Effects." (2017).
Gelman, Andrew, John B. Carlin, Hal S. Stern, David B. Dunson, Aki Vehtari, and Donald B. Rubin. Bayesian data analysis. CRC press, 2013.
Bürkner, Paul-Christian. "brms: An R package for Bayesian multilevel models using Stan." Journal of statistical software 80.1 (2017): 1-28.
"Student-T Distribution" found on the internet at: https://mc-stan.org/docs/2_22/functions-reference/student-t-distribution.html.
Gelman, Andrew, Daniel Lee, and Jiqiang Guo. "Stan: A probabilistic programming language for Bayesian inference and optimization." Journal of Educational and Behavioral Statistics 40.5 (2015): 530-543.
http://www.superbowlcommercials2016.org/blog/all-the-2016-superbowl-commercials/.
"Global ad spend has slowed but 2020 looks set to be a bumper year," found on the internet at: https://www.cnbc.com/2019/10/24/global-ad-spend-has-slowed-but-2020-looks-set-to-be-a-bumper-year.html.
M. Joo, K. C. Wilbur, B. Cowgill, and Y. Zhu, "Television advertising and online search," Management Science, vol. 60, No. 1, pp. 56-73, 2014.
S. Tirunillai and G. J. Tellis, "Does offline tv advertising affect online chatter? quasi-experimental analysis using synthetic control," Marketing Science, vol. 36, No. 6, pp. 862-878, 2017.

* cited by examiner

BAYESIAN ESTIMATION OF THE EFFECT OF AGGREGATE ADVERTISING ON WEB METRICS

BACKGROUND

The following relates generally to data analytics, and more specifically to web analytics used for marketing attribution.

Data analysis, or analytics, is the process of inspecting, cleaning, transforming and modeling data. In some cases, data analytics systems may include components for discovering useful information, collecting information, informing conclusions and supporting decision-making. Data analysis can be used to make decisions in a business, government, science or personal context. Data analysis includes a number of subfields including data mining and business intelligence. Data mining refers to techniques that focus on statistical modeling and knowledge discovery for predictive purposes (i.e., as opposed to purely descriptive purposes). Business intelligence refers to data analysis that relies heavily on data aggregation to support business decisions. In a statistical context, data analysis includes descriptive statistics, exploratory data analysis (EDA), and confirmatory data analysis (CDA).

In some cases, data analytics can be used to inform marketing decisions such as marketing attribution. Marketing refers to activities taken by companies and individuals to encourage potential customers to purchase products or services. Marketing activities may take a variety of different forms, which may be referred to as marketing channels. A person or company may employ a variety of different marketing channels such as email, TV, display, and social media to encourage sales.

Marketing attribution refers to the task of determining the impact of a marketing channel. In a multi-channel marketing environment, a purchase decision is often based on a series of interactions such as e-mail, mobile, display advertising, and social media. These interactions have both direct and indirect influence on the final decisions of the customer. Marketers are responsible for determining how various marketing efforts affect a customer's final purchasing decision. For example, a marketer can optimize an advertising budget by using a combination of interacting marketing channels.

However, the influence of each channel may be difficult to detect. For example, it may be difficult to distinguish between the effects of a television (TV) ad, a marketing email, and an online ad if a customer has been exposed to all of these marketing channels at different times. Similarly, it may be difficult to determine the precise impact of different marketing efforts within a given channel. If purchase decisions are attributed to the wrong marketing channels, marketing efforts may be directed to channels that are inefficient, which results in the loss of time and money.

SUMMARY

The present disclosure describes systems and methods for performing data analytics. Embodiments of the present disclosure include systems and methods for performing marketing attribution using Bayesian statistical methods. For example, a statistical model for marketing attribution may be based on a prior distribution for a time effect coefficient that decreases with time. That is, the prior distribution assumes that the impact of a marketing activity is lower if the activity was farther in the past.

Accordingly, a method, apparatus, and non-transitory computer readable medium for data analytics are described. Embodiments of the method, apparatus, and non-transitory computer readable medium include monitoring online activity corresponding to a plurality of users; receiving aggregate marketing data for a marketing activity; identifying online activity data for a time period corresponding to the marketing activity based on the monitoring; generating a regression model based on the aggregate marketing data and the online activity data using Bayesian regression, wherein the regression model represents a relationship between the marketing activity and the online activity, comprises a time effect coefficient, and is based on a prior distribution of the time effect coefficient that decays to zero as time increases; and estimating a treatment effect for the marketing activity on the online activity based on the regression model, wherein the treatment effect comprises a rate of effect decay.

A method, apparatus, and non-transitory computer readable medium for data analytics are described. Embodiments of the method, apparatus, and non-transitory computer readable medium include receiving aggregate marketing data comprising geographic information, product information, and time information of a marketing activity, receiving outcome data for the marketing activity, identifying prior distributions corresponding to a geographic effect coefficient, a product effect coefficient, and a time effect coefficient, wherein the prior distribution for the time effect coefficient decays to zero as time increases, generating a regression model representing a relationship between the aggregate marketing data and the outcome data using Bayesian regression based on the prior distributions, wherein the regression model comprises a geographic effect term based on the geographic effect coefficient, a product effect term based on the product effect coefficient, and a time effect term based on the time effect coefficient, and predicting a treatment effect for the marketing activity based on the regression model.

An apparatus and method for data analytics are described. Embodiments of the apparatus and method include a data component configured to receive aggregate marketing data and outcome data for a marketing activity, a regression component configured to generate a regression model using Bayesian regression based on the aggregate marketing data and the outcome data and further based on a prior distribution of a time effect coefficient that decays to zero as time increases, and an estimation component configured to estimate a treatment effect for the marketing activity based on the regression model, wherein the estimated treatment effect comprises a rate of effect decay.

DETAILED DESCRIPTION

Figure 1:
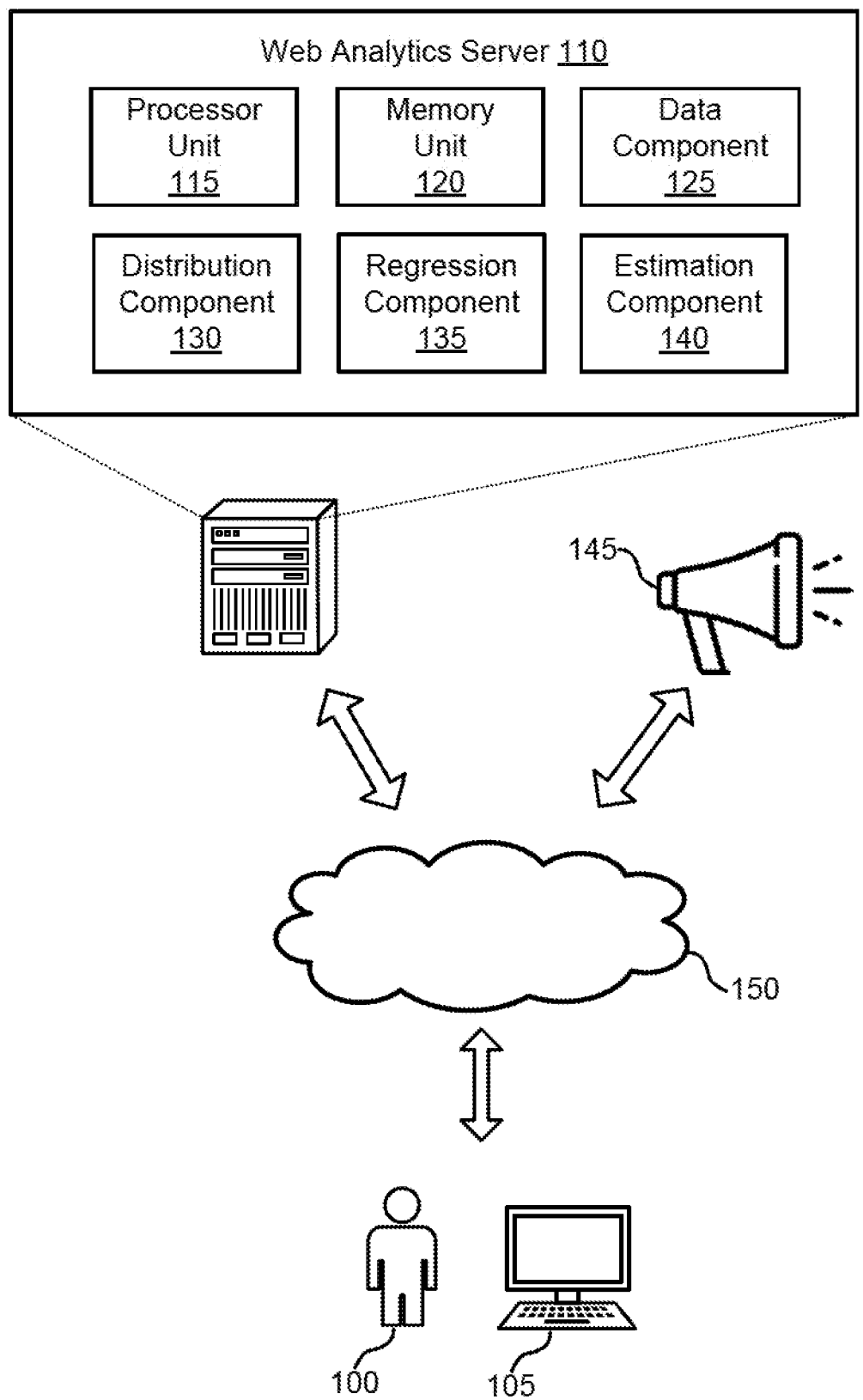
FIG. 1 shows an example of a system for data analytics according to aspects of the present disclosure.

The present disclosure relates generally to data analytics, and more specifically to web analytics for marketing attribution based on Bayesian regression. Some embodiments of the present disclosure predict the online activity of individuals (or groups of individuals) based on aggregate marketing data, including offline advertising such as television (TV) or radio advertising.

Aggregate marketing refers to forms of advertising that are not targeted to individuals, or for which individual data is not available. Aggregate advertising involves the effort to advertise to broad groups of potential customers, to drive awareness of a brands products and services. However, advertisers may not be aware of which individuals are exposed to the advertisements. Thus, it can be challenging to track the effects of the advertisements. TV commercials are an example of aggregate advertising. Other examples include radio commercials, traditional print media, billboards, etc.

Some digital advertising can also be characterized as aggregate marketing. For example, if a display ad shown on a screen (e.g., a tablet, desktop monitor, smart phone, etc.) is clicked by an end user to arrive at the brand's webpage, the web visit could be attributed to the display ad. However, if the visitor who sees the display ad continues to search for a query before arriving at the advertiser's website, attribution of the web traffic cannot be determined with certainty (assuming there are no third-party cookies). Therefore, aggregate marketing data can also be relevant for personalized forms of advertising.

Despite the growth of digital advertising, non-digital advertising such as TV is still the most important advertising medium for many organizations. However, the outcomes for many non-digital marketing activities may still be measured using online metrics. Since online metrics are often easier to collect, a consumer's relationship with a company is often recorded with an organization in the form of web and mobile application traffic and customer relationship management (CRM) data. For example, a TV ad may encourage customers to visit a website. Thus, attributing the effect of TV ads to digital outcomes is important for many vendors.

For TV ads, a variety of methods may be used to determine the effects of advertising on website or other online activities. One method is Nielsen's TV measurement technology, which provides estimates on the number of people who have seen the TV spot. They can additionally provide estimates with demographic breakdowns. In some cases, these estimates are based on a sample of households. While this technique may lead to estimates of ad viewership, the connection with outcomes of interest (e.g., orders or online activity) is usually not included.

Another method is to assign all website visits (or other online activity) in a certain time window subsequent to the TV spot (e.g., the first 5 minutes after the ad) as being due to the TV commercial. However, this method may not take into account other factors that can influence online activity during that time period.

A third method that has been proposed is to identify whether a specific user has been exposed to an ad and then measure subsequent online activity. For example, an ad may emit high frequency sounds (e.g., from a TV speaker), and a different device may receive the sounds (e.g., using the microphone on a tablet device) in order to track whether a user viewed the ad, and connect the ad viewing to subsequent online activity. However, this approach can lead to significant privacy concerns. Additionally, the approach depends on a particular technological environment that may not be sufficiently widespread.

The present disclosure provides methods and systems to estimate the effect of aggregate advertising on website or mobile metrics (e.g., in areas where the advertiser does not have complete information about recipients of the advertisement). Using online marketing data to estimate the effect of aggregate marketing activities as described herein enables improved marketing attribution in a privacy sensitive manner. According to an aspect of the present disclosure, Bayesian regression model is used to effectively estimate the impact of an ad on metrics that are easily observable and obtainable using automated technology. In some examples, the described systems and methods generate error bounds or confidence intervals for the estimates.

For example, a marketer may have direct access to web analytics such as website clicks, and these analytics may be tracked at an individual level. That is, the marketer may have information about the identity of each person who accesses or clicks on a website. The marketer may also have information about an advertising campaign directed toward increasing traffic to the website. However, the information may be at the aggregate level. That is, the marketer may know when and where an ad was shown, or how many people saw the ad, but the marketer may not know whether a particular person who visited a website has previously been exposed to the ad. Using conventional analytics techniques, the marketer may not be able to correctly determine the impact of the ad on a website visit (or other observable activity) on an individual level. However, using the systems and methods described herein, the marketer will be able to make an improved prediction about the impact of the marketing campaign at an individual level.

As used herein, the term "online activity data" refers to data collected from a web application, a mobile application, or another online application. For example, the online activity data may include website views, website interactions (e.g., clicks), website sales data, mobile app usage data, or other data representing online activity. The online activity data may include data specific to individual users.

The term "aggregate marketing data" refers to marketing data related to the performance of a marketing campaign. For example, the marketing data may include times and regions when a TV advertisement (or an online search advertisement) is displayed. The data may also include information about which products are featured in the advertisement and other information related to the advertisement. In many cases, the aggregate marketing data may not include data specific to individual users. For example, it may not include information about whether a particular user has seen an advertisement.

The term "regression model" refers to a model that describes the relationship between a dependent variable and one or more independent variables. In one example, the aggregate marketing data is one of the independent variables and the online activity data is the dependent variable. The term regression refers to the process of finding model parameters that ensure the model fits the data.

The term "Bayesian regression" refers to a process for generating a regression model that is based on prior distributions of the model parameters. Therefore, Bayesian regression can leverage prior information about the form or distribution of the parameters. For example, some embodiments of the present disclosure use a prior distribution for a time effect coefficient that decays with respect to time. This can reflect prior knowledge about the effects of advertising on customer decision making. In some examples, Bayesian regression may also enable the generation of confidence intervals describing how likely the model is to be accurate.

The term "treatment effect" refers to the effect of the marketing activity on the measured outcomes. In some cases, the treatment effect refers to a predicted effect of an advertisement on an individual visitor to a website. For example, the treatment effect of airing a TV advertisement about a product at a particular time in a particular geographic region may be to increase traffic to a website describing that product. Since the impact of the advertising may be limited, the treatment effect may be represented as a function of the one or more variables (e.g., time, product, and location).

FIG. 1 shows an example of a system for data analytics according to aspects of the present disclosure. The example shown includes user 100, user device 105, web analytics server 110, marketing provider 145, and cloud 150.

Web analytics server 110, processor unit 115 and memory unit 120 are examples of, or include aspects of, the corresponding elements described with reference to FIG. 2. In one embodiment, web analytics server 110 includes processor unit 115, memory unit 120, data component 125, distribution component 130, regression component 135, and estimation component 140.

In one example, the user 100 manages a marketing campaign including marketing activities performed using the marketing provider 145. An application of the user device 105 may connect with the web analytics server 110 via the cloud 150 to monitor online activity of customers (e.g., website visits, clicks, or online sales). In some cases, the impact of advertisements may be tracked directly using cookies or other online tracking mechanisms. However, in other cases, the effects of marketing activities are determined by receiving marketing data from the marketing provider 145 (e.g., a provider of TV advertisements or online search advertisements), and modeling the relationship between the online activity and the marketing data. Thus, in some cases aggregate marketing data is received indirectly (i.e., from a third party), and may not be as detailed as online activity data which may be monitored directly or in more detail.

In one example, the cloud 150 is a computer network configured to provide on-demand availability of computer system resources, such as data storage and computing power. In some examples, the cloud 150 provides resources without active management by the user. The term cloud 150 is sometimes used to describe data centers available to many users over the Internet. Some large cloud networks have functions distributed over multiple locations from central servers. A server is designated an edge server if it has a direct or close connection to a user. In some cases, the cloud 150 is limited to a single organization. In other examples, the cloud 150 is available to many organizations. In one example, a cloud includes a multi-layer communications network comprising multiple edge routers and core routers. In another example, a cloud 150 is based on a local collection of switches in a single physical location.

The web analytics server 110 provides one or more functions to users linked by way of one or more of the various networks. In some cases, the server includes a single microprocessor board, which includes a microprocessor responsible for controlling all aspects of the server. In some cases, a server uses a microprocessor and protocols to exchange data with other devices/users on one or more of the networks via hypertext transfer protocol (HTTP), and simple mail transfer protocol (SMTP), although other protocols such as file transfer protocol (FTP), and simple network management protocol (SNMP) could also be used. In some cases, a server is configured to send and receive hypertext markup language (HTML) formatted files (e.g., for displaying web pages). In various embodiments, a server comprises a general purpose computing device, a personal computer, a laptop computer, a mainframe computer, a supercomputer, or any other suitable processing apparatus.

The processor unit 115 is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, the processor is configured to operate a memory array using a memory controller. In other cases, a memory controller is integrated into the processor. In some cases, the processor is configured to execute computer-readable instructions stored in a memory to perform various functions. In some embodiments, a processor includes special purpose components for modem processing, baseband processing, digital signal processing, or transmission processing.

Examples of a memory unit 120 include random access memory (RAM), read-only memory (ROM), or a hard disk. Examples of memory devices include solid state memory and a hard disk drive. In some examples, memory is used to store computer-readable, computer-executable software including instructions that, when executed, cause a processor to perform various functions described herein. In some cases, the memory contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

In some examples, web analytics server 110 includes an artificial neural network (ANN) for generating or representing regression models. An ANN is a hardware or a software component that includes a number of connected nodes (i.e., artificial neurons), which loosely corresponds to the neurons in a human brain. Each connection, or edge, transmits a signal from one node to another (like the physical synapses in a brain). When a node receives a signal, it processes the signal and then transmit the processed signal to other connected nodes. In some cases, the signals between nodes comprise real numbers, and the output of each node is computed by a function of the sum of its inputs. Each node and edge is associated with one or more node weights that determine how the signal is processed and transmitted.

During the training process, these weights are adjusted to improve the accuracy of the result (i.e., by minimizing a loss function which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

According to some embodiments, data component 125 receives aggregate marketing data and outcome data (e.g., online activity data) for a marketing activity. In some examples, both the aggregate marketing data and the outcome data include time series data. In some cases, the aggregate marketing data or the outcome data is transformed to comply with a standard time series format so that the different types of data can be compared along a common timeline. In some examples, data component 125 identifies a first time period occurring before the marketing activity (e.g., the hour or day prior to the activity), and a second time period occurring after the marketing activity (e.g., the hour or day following the activity), and then collects the outcome data for the first time period and the second time period.

In some examples, data component 125 identifies an impacted geographic region for the marketing activity along with a control region, and collects the outcome data for the impacted geographic region and the control region. In some cases, the regression model includes a geographic effect coefficient.

In some examples, data component 125 identifies a product associated with the marketing activity, along with a control product and collects the outcome data for the product and the control product. In some cases, the regression model includes a product effect coefficient.

In some examples, data component 125 collects analytics data for a website, a web-based application, or another online application such as a mobile application, so the outcome data includes the analytics data. In some examples, data component 125 collects sales data, where the outcome data includes the sales data. According to some embodiments, data component 125 receives aggregate marketing data including geographic information, product information, and time information of a marketing activity. In some examples, data component 125 receives outcome data for the marketing activity.

According to some embodiments, data component 125 can be configured to receive aggregate marketing data and outcome data for a marketing activity. Data component 125 is an example of, or includes aspects of, the corresponding element described with reference to FIG. 2.

According to an embodiment of the present disclosure, the attribution of aggregate advertising brings two disparate data sources together. A first type of data includes detailed features associated with aggregate advertising (e.g., type, timing, the geographic scope, etc.). One example of the first type of data is TV flighting data. The second type of data is website or mobile analytics data which contains intended outcome of the intervention (e.g., visits, purchases, revenue). The first type of data could be sourced from the media wing of a company and may be specified in the analytics tool. The second type of data could be collected in analytics tools such as Adobe® Analytics, and may be readily available for analysis.

In one example, a user collects a significant amount of web data using Adobe® Analytics application. The web data collected plays an important role in many applications, well beyond traditional use of reporting. One such role is the possibility of evaluating the return on investment (ROI) from aggregate advertising expenditure. Embodiments of the present disclosure allow exploiting additional value embedded inside web data (e.g., collected using Adobe® Analytics) The regression model and methods provided are useful for customers who advertise on TV (e.g., Adobe® Analytics customers).

According to an embodiment of the present disclosure, the system identifies the geographic region in which the aggregate advertisement was aired. The system additionally identifies regions in which the ad was not aired (i.e., a control region). In this way, the system is able to control across geographies. According to an embodiment of the present disclosure, the time period during which the ad is aired is identified. A period prior to and post this time of the ad are also analyzed. For example, one-day prior and one-day post is analyzed assuming the ad is aired only once during a three-day period.

According to an embodiment, the system also identifies which ad was associated with which product. Additionally, a similar number of products which were not advertised for are also identified. These products, which were not advertised for, are the control group. For example, "product" is just a place-holder, it may include other ways in which the brand's business breaks down. For example, it could identify services (a bank treats accounts and mortgages differently), business lines (a hardware manufacturer treats enterprise, small and medium sized business (SMB), and personal businesses differently). Finally, requirement of specifying product could be optional and omitted, but having the requirement of specifying product may provide additional control data to improve the estimates.

According to some embodiments, distribution component 130 identifies the prior distribution of the time effect coefficient, where the prior distribution of the time effect coefficient includes an exponential distribution. In some examples, distribution component 130 identifies a Student's t-distribution, where the regression model includes an intercept term based on the Student's t-distribution. In some examples, distribution component 130 identifies a normal prior distribution, where the regression model includes a seasonality term based on the normal prior distribution. In some examples, distribution component 130 identifies a normal distribution based on a correlation matrix having an auto regressive structure of degree 1, where the regression model includes an error term based on the normal distribution. In some examples, the prior distribution of the time effect coefficient decays after a threshold time following the marketing activity.

According to some embodiments, distribution component 130 identifies prior distributions corresponding to a geographic effect coefficient, a product effect coefficient, and a time effect coefficient, where the prior distribution for the time effect coefficient decays to zero as time increases.

According to some embodiments, distribution component 130 can be configured to identify a prior distribution for each of a plurality of coefficients of the regression model. Distribution component 130 is an example of, or includes aspects of, the corresponding element described with reference to FIG. 2.

The embodiments of the present disclosure include a Bayesian regression model that is used to estimate a treatment effect of an advertisement or other marketing activity. Bayesian statistical inference is the area of study where it is assumed that the parameter of interest (e.g., the population mean of a random variable) is itself a sample from a prior statistical distribution. Bayesian inference is used to narrow down the distribution of this parameter, given the observed data.

According to some embodiments, regression component 135 generates a regression model representing a relationship between the aggregate marketing data and the outcome data using Bayesian regression, where the regression model includes a time effect coefficient and the Bayesian regression is based on a prior distribution of the time effect coefficient that decays to zero as time increases. In some examples, regression component 135 samples from a posterior distribution of a parameter space for each parameter of the regression model. In some examples, regression component 135 estimates an effect for each parameter of the regression model based on the sampling.

In some examples, the regression model is based on a set of variance terms, where each of the variance terms is based on a Student's t-distribution. In some examples, a geographic effect coefficient, a product effect coefficient, and a geography-product interaction coefficient of the regression model are each based on a flat prior distribution. In some examples, the Bayesian regression is based on a No-U-Turns sampling method for sampling from posterior parameter distributions.

A Hamiltonian Monte Carlo (HMC) is a Markov chain Monte Carlo (MCMC) algorithm where HMC's performance is highly sensitive to two parameters from a user, a step size, $\varepsilon$, and a desired number of steps, L. No-U-Turn Sampler (NUTS) serves as an extension to HMC approach and applies a recursive algorithm to adaptively finding a good number of steps L. The NUTS algorithm tries to figure out when the path starts to turn around, or retrace its steps. NUTS finds a way to tune the trajectory length, that is repeatedly double the length of the current trajectory, until there is a part of the trajectory that makes a "u-turn", heading back towards its starting point. Additionally, it needs to simulate the path in both directions.

According to some embodiments, regression component 135 generates a regression model representing a relationship between the aggregate marketing data and the outcome data using Bayesian regression based on the prior distributions, where the regression model includes a geographic effect term based on the geographic effect coefficient, a product effect term based on the product effect coefficient, and a time effect term based on the time effect coefficient. In some examples, the regression model further includes a geography-product interaction term, an intercept term, a seasonality term, and an error term.

According to some embodiments, regression component 135 can be configured to generate a regression model using Bayesian regression based on the aggregate marketing data and the outcome data and further based on a prior distribution of a time effect coefficient that decays to zero as time increases. Regression component 135 is an example of, or includes aspects of, the corresponding element described with reference to FIG. 2.

According to some embodiments, estimation component 140 estimates a treatment effect for the marketing activity based on the regression model, where the treatment effect includes a rate of effect decay. In some examples, estimation component 140 averages the effect for each parameter of the regression model, where the treatment effect is based on the averaging. In some examples, estimation component 140 provides an uncertainty measure for at least one estimated parameter of the regression model. Estimation component 140 is an example of, or includes aspects of, the corresponding element described with reference to FIG. 2.

According to some embodiments of the present disclosure, the regression model analyzes incremental effect of aggregate advertisement after controlling factors such as geography, time, and product. In one embodiment, the Bayesian model can capture the treatment effect of the ad, including a decay in the effect over time, and provide measures of uncertainty. The treatment effect is estimated by contrasting three dimensions such as geography, time, and products.

According to an embodiment, the Bayesian regression model uses the No-U-Turns sampling method for sampling from the posterior distribution of the parameters. One advantage of the Bayesian regression approach is to readily obtain error bounds for the parameters of interest. Additionally, it is convenient for the statistical model to generate estimate of the incremental effect of the advertisement, through sampling from the posterior distribution of parameter space, and estimating the effect from each sample, and finally averaging across these samples.

According to some embodiments, marketing provider 145 airs a TV advertisement, where the aggregate marketing data includes data about the TV advertisement.

Figure 2:
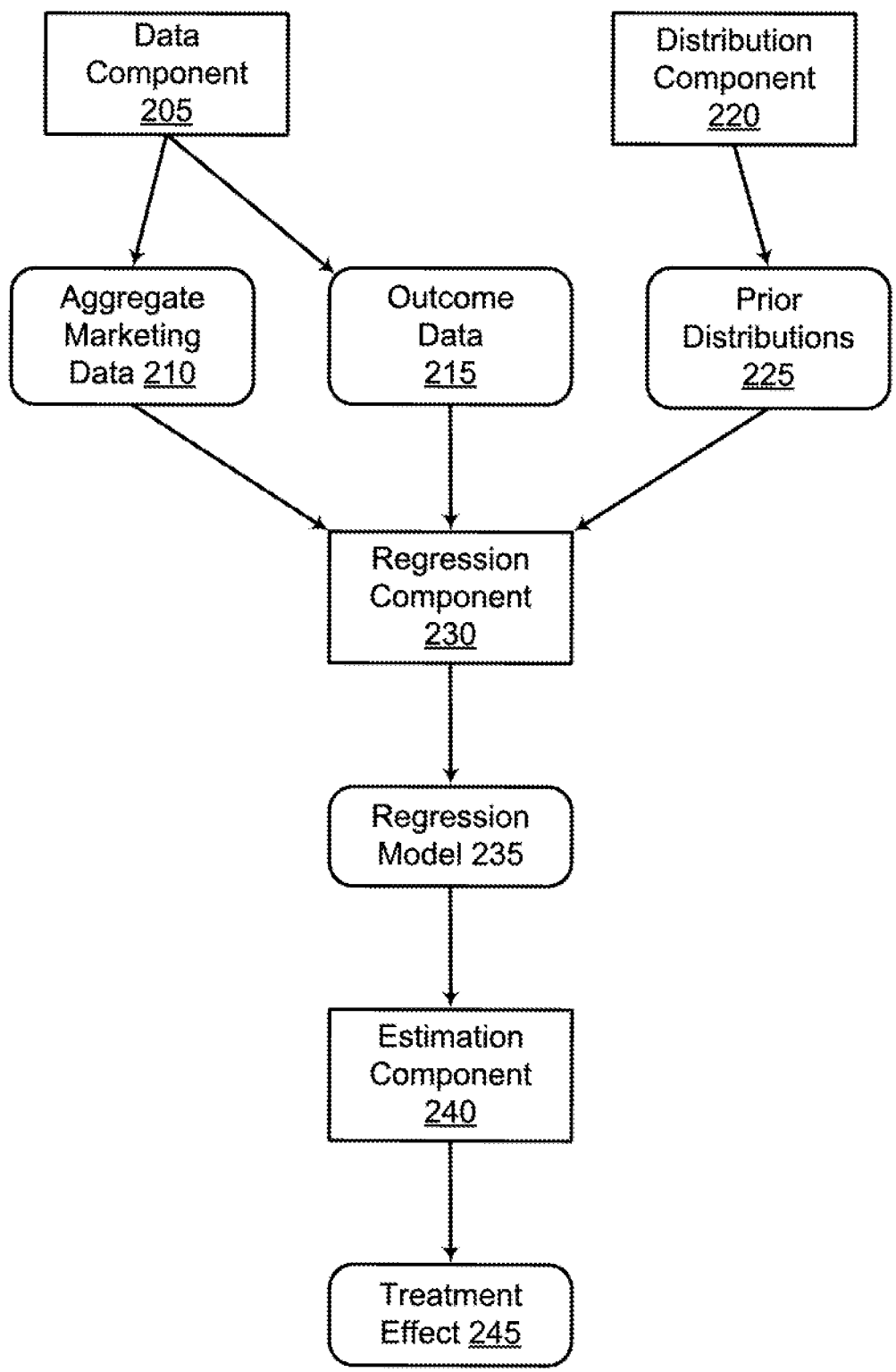
FIG. 2 shows an example of a web analytics server according to aspects of the present disclosure.

FIG. 2 shows an example of a web analytics server 200 according to aspects of the present disclosure. The example shown produces data products and factors including aggregate marketing data 210, outcome data 215, prior distributions 225, regression model 235, and treatment effect 245. The web analytics server 200 includes data component 205, distribution component 220, regression component 230, and estimation component 240, which are examples of, or include aspects of, the corresponding elements described with reference to FIG. 1.

Embodiments of the present disclosure relate to analyzing incremental effect of aggregate advertisement after controlling factors such as geography, time, and product. Some embodiments also relate to correlating aggregate marketing data 210 (such as TV ad data) with outcome data 215 such as website analytics data observed in analytics tool (e.g., Adobe® Analytics) through the web analytics server 200. According to an embodiment, a Bayesian model is used to estimate the effect of a TV commercial on brand's website metrics (e.g., visits and page views). The Bayesian model can capture the treatment effect of the ad, including a decay in the effect over time, and provide measures of uncertainty. The treatment effect is estimated by contrasting three dimensions such as geography, time, and products.

As illustrated in FIG. 2, data component 205 provides aggregate marketing data 210 and outcome data 215, while distribution component 220 provides prior distributions 225 to the regression component 230. According to an embodiment of the present disclosure, web analytics server 200 connects two disparate data types (i.e., aggregate marketing data 210 and outcome data 215) from different sources. The aggregate marketing data 210 includes detailed features associated with aggregate advertising (e.g., type, timing, geographic scope, etc.). The aggregate marketing data 210 could be collected from the media wing or marketing department of a company, from a third party service, or it may be specified in an analytics tool.

A second type of data is referred to as outcome data 215. In one example, the outcome data 215 is website or mobile analytics data which contains intended outcome of the intervention (e.g., visits, purchases, revenue). The outcome data 215 can be collected using analytics tools such as Adobe® Analytics, and may be readily available for analysis.

According to an embodiment of the present disclosure, the regression component 230 generates a regression model 235 based on the data and the prior distributions 225. The prior distributions 225 may be identified based on knowledge (or lack of knowledge) about the form of the parameters to be included in the regression model 235. For example, in some cases it may be assumed that the impact of a marketing activity decays with time.

In one example, the regression model 235 identifies the geographic region in which the aggregate advertisement was aired, as well as regions in which the ad was not aired. In this way, the regression model 235 is able to control across geographies. According to an embodiment, the time period during which the ad is aired is also identified. A period prior to and post the period during which the ad is aired are also analyzed. For example, one-day prior and one-day post is analyzed assuming the ad is aired only once during a three-day period.

According to an embodiment, the regression model 235 also identifies which ad is associated with which product. Additionally, a similar number of products which were not advertised for are also identified. These products, which were not advertised for, are the control group. Specifying a product is optional and may be omitted, but specifying the product may provide additional control data to improve the estimates.

Bayesian regression uses the specification of prior distributions for the parameters of interest. In some cases, parameters are chosen in an automated manner. These may be referred to as improper flat priors over the real line. The examples below are informative (i.e., as the data increases in volume, the effect of these choices vanishes).

According to an embodiment of the present disclosure, the system receives a time series of the outcome (e.g. visits and page views), denoted by V (where the time unit starts at the beginning of the time the ad is aired). The model additionally breaks down these views by product and geography. Then, the model has indicator variables for whether each time point belongs to a geography where the ad was aired or not (G), whether the product was advertised or not (P), and whether the hour was such that the aggregate ad was aired during that hour or within a small window prior (T). Additionally, let H denote the time variable including the hour of the day (day part). According to an exemplary embodiment of the present disclosure, the regression model is that the variable V is regressed on G, P, T, H, and P×G, where, A×B denotes the interaction between the two variables A and B (i.e., capturing the synergistic effect between the two variables).

According to an exemplary embodiment of the present disclosure, the regression model includes the following notations:

Let $V_{ij}$ denote value of the outcome measure for product i and time j. In some cases, i takes one of a small number of values, some of which are products that were advertised for, and some of which were not. Further, j is the time index. Let $H_i$ denote a variable that captures seasonality, for example, if performing the analysis at the hourly level, it takes one of 24 categorical values (i.e., day part). To reduce cardinality, this seasonal effect is modeled as a random effect. Next, let $P_{ij}$ be an indicator of whether the product i was advertised for. Let $T_{ij}$ denote a variable which captures the hours since the airing of the ad, this allows modeling the decay in the outcome measure as time passes. $T_{ij}$ is 0 for the products and countries which were not advertised/advertised to, since no decay is expected in the value of the outcome. Additionally, let $G_{ij}$ denote whether the ad was aired in the geography or not.

In one example, the web analytics server 200 builds a regression model as follows:

$$\log(V_{ij}) = \alpha + \beta_1 G_{ij} + \beta_2 P_{ij} + \beta_3 T_{ij} + \beta_{12} G_{ij} P_{ij} + h_j + \varepsilon_{ij} \quad (1)$$

According to some embodiments of the present disclosure, the regression model includes a log-normal regression. In this way, the logarithm of the outcome is linear in the features, follows Gaussian distribution, and compensates for the high positive skew of the outcome. This choice may be borne out by the data among other distributions. That is, the features have a multiplicative effect on the outcome measure. The coefficient $\alpha$ is an intercept term. The parameter $\beta_1$ is a coefficient of the geographic effect. The parameter $\beta_2$ is a coefficient of the product effect. The term $\beta_3$ is a coefficient of the time from the advertisement being aired. This term provides the ability to estimate main effect of the advertisements as well as a decay effect. The parameter $\beta_{12}$ is an interaction term, this parameter allows to contrast geographies and advertised products simultaneously.

In one embodiment, the seasonal term $h_j$ is a random effect and is $h_j \sim N(\theta, \sigma_h^2)$. The error term is $(\varepsilon_{i1}, \varepsilon_{i2}, \ldots, \varepsilon_{iT}) \sim N(0, \Sigma_i)$, where the correlation matrix $\Sigma_i$ has an auto regressive structure of degree 1, that is $\text{Cov}(\varepsilon_{ij}, \varepsilon_{ij+t}) = \rho_i^t \sigma_i^2$.

According to an example, the intercept term assumed to be a Student's-t with 3 degrees of freedom, $\alpha \sim \text{Student}_3(4, 10)$. The present disclosure models the parameters $\beta_1, \beta_2, \beta_{12}$ as having non-informative flat priors. For $\beta_3$, the model assumes $-\beta_3 \sim \text{Exponential}(0.1)$ prior. The rationale behind is to force a decay function that goes towards 0 and cannot explode to infinity. The priors for the variance terms are assumed to be Student's-t as well. In particular, $\sigma_h \sim \text{Student}_3(0, 10)$ and $\sigma_i \sim \text{Student}_3(0, 10)$. The auto-regressive term $\rho$ is assumed to have a uniform prior in $(-1, 1)$.

Bayesian regression uses the specification of prior distributions for the parameters of interest. Choosing priors for parameters in an automated manner is needed. In one example, flat priors may be specified over a range on the real line. In some cases, the choices are weakly informative (i.e., as the data increases in volume, the effect of these choices vanish).

Treatment effect 245 is an example of, or includes aspects of, the corresponding element described with reference to FIG. 4. Embodiments of the present disclosure provide the regression model to analyze incremental effect of aggregate advertisement after controlling factors such as geography, time, product. In one embodiment, the Bayesian regression model captures the treatment effect 245 of the ad, including a decay in the effect over time, and provides measures of uncertainty. The treatment effect 245 is estimated by contrasting three dimensions such as geography, time, and products. In one embodiment, the web analytics server 200 estimates a treatment effect of an advertisement (e.g., TV commercials).

In an exemplary embodiment of the present disclosure, the statistical model can estimate decay of a treatment effect 245. For example, the model may show how fast the effect of an ad (e.g., TV commercials) decays. In one example, half-life of TV ad is computed by taking $$-\log_e \frac{0.5}{\beta_3}.$$

Figure 3:
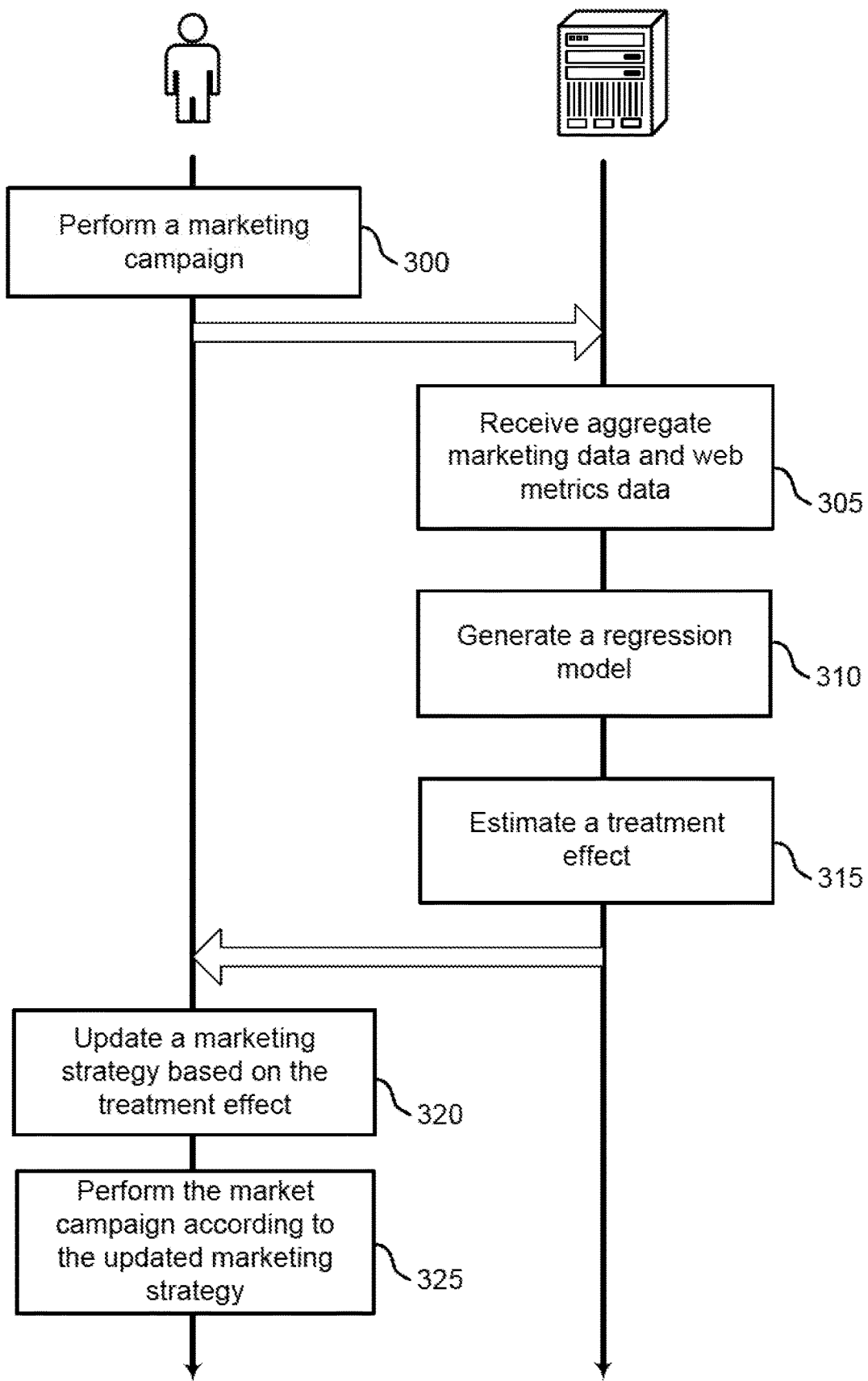
FIG. 3 shows an example of a process for utilizing data analytics in a marketing campaign according to aspects of the present disclosure.

FIG. 3 shows an example of a process for utilizing data analytics in a marketing campaign according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 300, a user or a marketing provider performs a marketing campaign. The marketing campaign may include TV, radio, print, or any other form of advertisement in which detailed information about when individual users see the ad is not available. In some cases, the operations of this step may refer to, or be performed by, a marketing provider as described with reference to FIG. 1.

In one example, a marketing provider performs marketing campaign for one or more products in some chosen geographic areas to increase revenue for sale of the one or more products. In some cases, the marketing provider presents a single ad to a large group of individuals through traditional media such as TV and print. This is often referred to as aggregate advertising.

At operation 305, a web analytics server receives aggregate marketing data and web metrics data. The web analytics data may be obtained by constant monitoring of certain web metrics such as web views, clicks, sales, or the web-based interactions. Specific data related to the marketing activity may be obtained by identifying the online activity data for a time period surrounding the marketing activity. In some cases, the operations of this step may refer to, or be performed by, a data component as described with reference to FIGS. 1 and 2.

Website metrics are often observable and readily available in modern analytics suites. This can also be referred to as outcome data. In many cases, a marketing provider has aggregate marketing data, which may also be referred to as treatment data. Website metrics and aggregate marketing data represent two disparate data sources (i.e., interaction and revenue realization). Both data sources are input into the web analytics server before conducting estimation of the effect of TV advertising on website metrics. According to an example, data is broken down into a set of one-hour intervals according to product and geography (e.g., US vs. the other regions).

At operation 310, the web analytics server generates a regression model. For example, the model may be based on an equation such as equation 1. In some cases, the operations of this step may refer to, or be performed by, a regression component as described with reference to FIGS. 1 and 2.

Embodiments of the present disclosure relate to generating a model for analyzing the incremental effect of aggregate advertisement after controlling factors such as geography, time, product. Some embodiments also relate to correlating TV ads with website analytics data observed in analytics tool (e.g., Adobe® Analytics) through the web analytics server 200. Embodiments of the present disclosure use a Bayesian model to estimate the effect of a TV commercial on brand's website metrics (e.g., visits and page views).

At operation 315, the web analytics server estimates a treatment effect. For example, the treatment effect may be estimated by inserting data into the regression model. In some cases, the operations of this step may refer to, or be performed by, an estimation component as described with reference to FIGS. 1 and 2.

In one embodiment, the Bayesian model can capture the treatment effect of an ad, including a decay in the effect over time, and can also provide measures of uncertainty. In some examples, the treatment effect is estimated by contrasting three dimensions such as geography, time, and products.

At operation 320, the user or marketing provider updates a marketing strategy based on the treatment effect. For example, updating the marketing strategy may include reallocating budget among a variety of marketing channels, or among different regions or time periods to maximize a desired outcome. For example, if the attribution model suggests that some regions respond more to certain products (or certain advertising channels), marketing budget may be reallocated to those products or channels. In some cases, the operations of this step may refer to, or be performed by, a marketing provider as described with reference to FIG. 1.

The marketing provider can measure the efficacy between treatment data and outcome data (e.g., interaction and revenue realization). Having the Bayesian regression model, the marketing provider can estimate the impact of an ad on observable website metrics. The marketing provider adjusts the brand's investment on advertising (e.g., investment on TV advertising) based on the estimated treatment effect provided by the regression model.

At operation 325, the user or marketing provider performs the market campaign based on the updated marketing strategy. In some cases, the operations of this step may refer to, or be performed by, a marketing provider as described with reference to FIG. 1.

A marketing provider performs marketing campaign for one or more products in some chosen geographic areas based on the updated marketing strategy. The marketing provider adjusts advertising expenditure based on the estimated treatment effect to optimize returns of investment on advertising (e.g., TV advertising). After evaluating an estimation of the treatment effect of the ad on website metrics (e.g., page views or visits) along with decay effect of the ad, the marketing provider adjusts marketing campaign for one or more products in chosen geographic areas in order to increase revenue or sale of advertised products.

Figure 4:
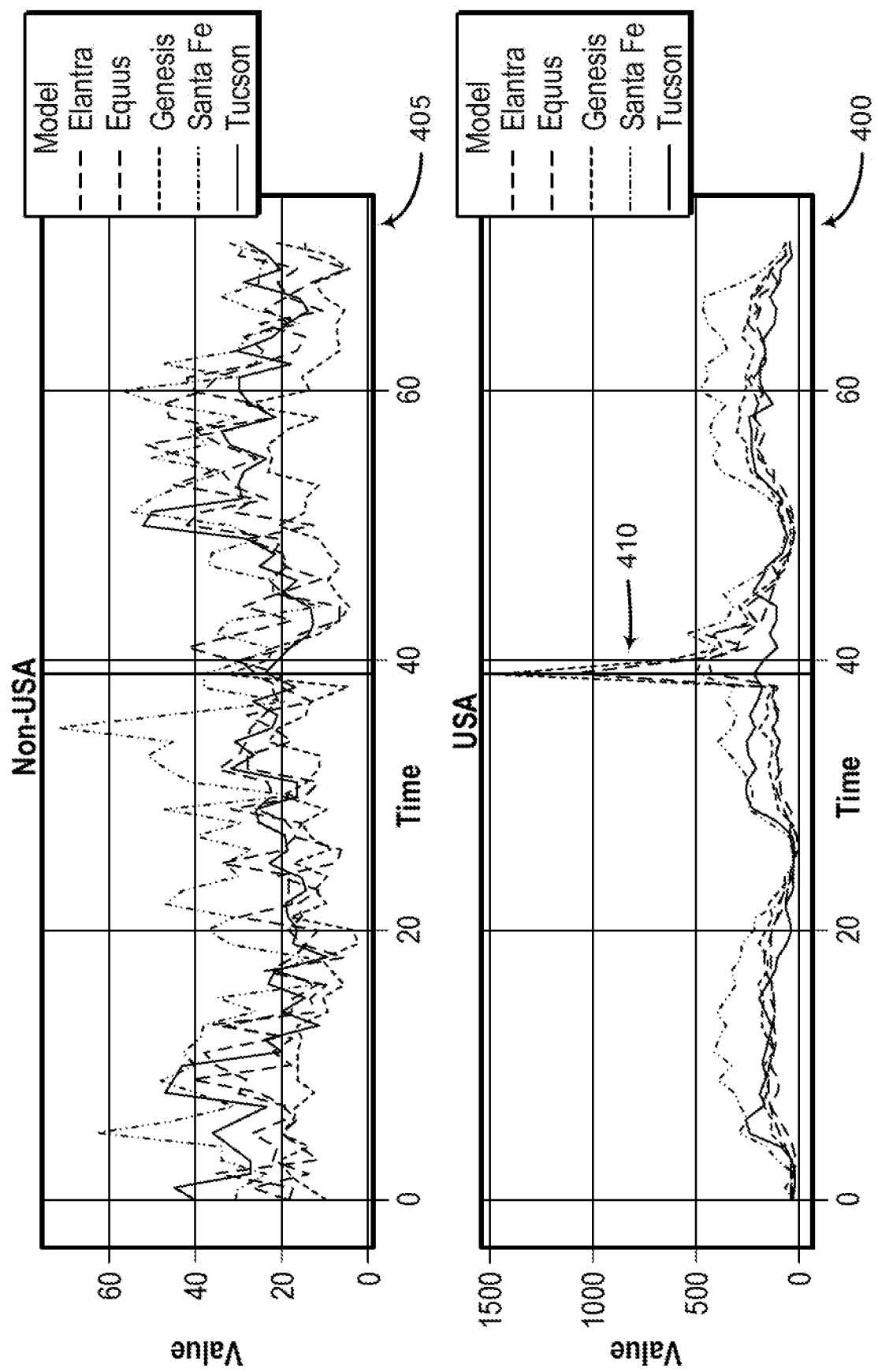
FIG. 4 shows an example of web analytics data showing a treatment effect according to aspects of the present disclosure.

FIG. 4 shows an example of web analytics data showing a treatment effect 410 according to aspects of the present disclosure. The example shown includes regional data 400, comparison data 405, and treatment effect 410. Treatment effect 410 is an example of, or includes aspects of, the corresponding element described with reference to FIG. 2.

In some embodiments, a marketing provider performs a marketing campaign for one or more products in some chosen geographic areas in order to increase revenue or sale of the one or more products. In some cases, the marketing provider presents a single ad to a large group of individuals through traditional media such as TV and print.

For example, car manufacturer Hyundai® had advertisement slots for three models, "Genesis®", "Equus®" and "Elantra®" during the Super Bowl® of 2016. These ads were shown only on TV in US, and the regression model uses geographic areas outside US as a control group. Additionally, Santa Fe® and Tucson® (i.e., models of Hyundai®) were not featured in the ads, therefore they were used as control group. The statistical model analyzes a three-day period spanning the Super Bowl® day, and uses other time periods as another control group for the intervention period. The web analytics server estimates a treatment effect of the ad, including a decay in the effect over time and provides measures of uncertainty. According to an example, data is broken down into a set of one-hour interval based on product and geography (US vs. control regions). The web analytics server tracks and displays a horizontal line which represents time at which the Super Bowl® started.

As illustrated, there is a positive treatment effect 410 (i.e., an increase in website visits) on the number of website views or visits in the U. S., but not so much for visits in other geographic areas. This can be attributed to the fact that the ad was only shown in the U. S. An estimated hourly increase in visits to each product page from the ad is 419, with a 95% error bound (i.e., credible interval is (307, 645)). The increase is seen a few hours post the ad. A clear circadian cycle (e.g., daily seasonality) in the data can be observed. In addition, the observed data is plotted against the model-generated estimates for comparison. Experiments on real data has demonstrated that important aspects of the data are captured by the model fit. In some cases, the regression model can estimate decay of ad effect (i.e., how fast the effect of the ad decays).

Figure 5:
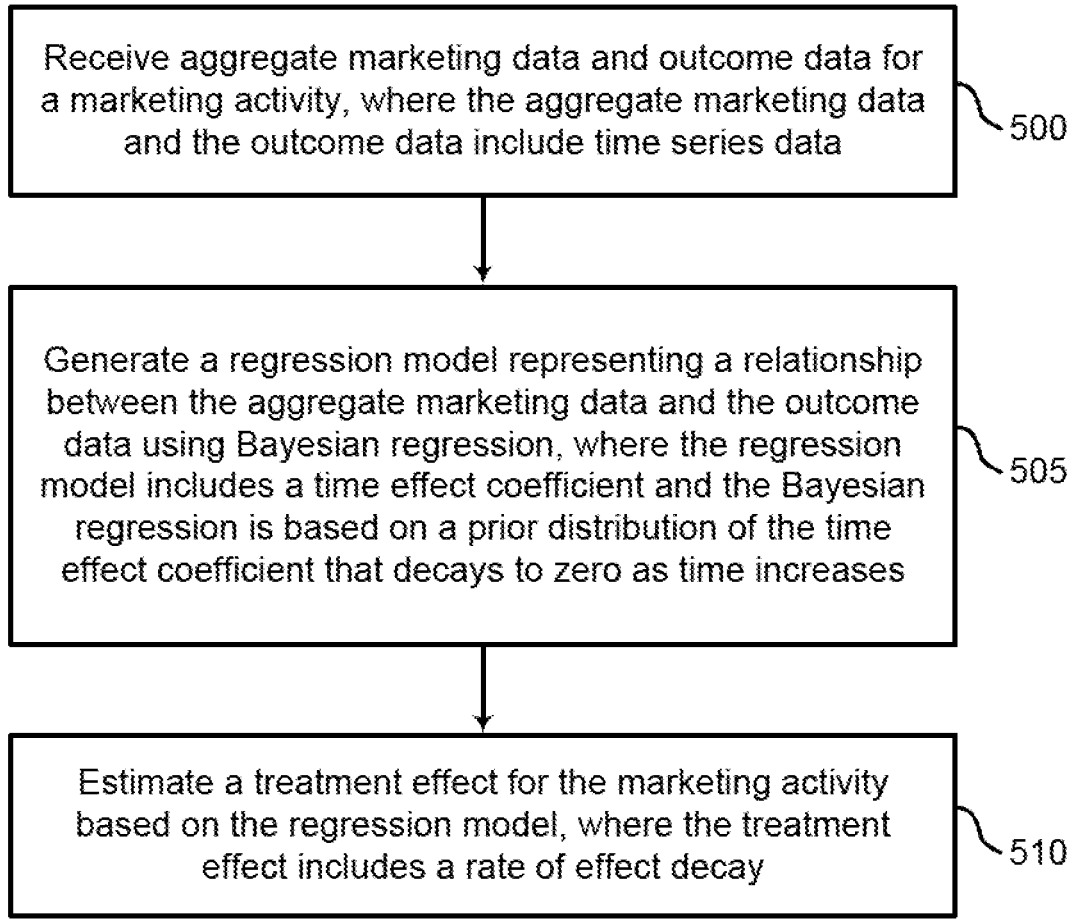
FIG. 5 shows an example of a process for data analytics according to aspects of the present disclosure.

FIG. 5 shows an example of a process for data analytics according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 500, the system receives aggregate marketing data and outcome data for a marketing activity, where the aggregate marketing data and the outcome data include time series data. In some cases, the operations of this step may refer to, or be performed by, a data component as described with reference to FIGS. 1 and 2.

According to an embodiment of the present disclosure, marketing attribution of aggregate advertising connects two disparate data sources, that is, aggregate advertisement schedules and web analytics data. A first type of data includes detailed features associated with aggregate advertising (e.g., type, timing, geographic scope, etc.). One example of the first type of data is TV flighting data. The second type of data is website or mobile analytics data which contains intended outcome of the intervention (e.g., visits, purchases, revenue). The first type of data could be sourced from the media wing of a company and may be specified in the analytics tool. The second type of data could be collected in analytics tools such as Adobe® Analytics, and may be readily available for analysis.

For example, Adobe® collects a significant amount of web data using Adobe® Analytics application. The web data collected plays an important role in many applications, well beyond traditional use of reporting. One such role is the possibility of evaluating the ROI from aggregate advertising expenditure. Embodiments of the present disclosure allow exploiting additional value embedded inside Adobe® Analytics data. The regression model and methods provided are useful for customers who advertise on TV (e.g., Adobe® Analytics customers).

The treatment effect is estimated by contrasting three dimensions, including geography (e.g., ads aired in one of two regions), time (e.g., considering periods before and after the airing), and products (e.g., considering two sets of products, only one of which was advertised). According to an embodiment of the present disclosure, the model identifies the geographic region in which the aggregate advertisement was aired. The model additionally identifies regions in which the ad was not aired. In this way, the model is able to control across geographies.

According to an embodiment, the time period during which the ad is aired is identified. A period prior to and post the period during which the ad is aired are also analyzed. For example, one-day prior and one-day post is analyzed assuming the ad is aired only once during a three-day period.

According to an embodiment, the model also identifies which ad is associated with which product. Additionally, a similar number of products which were not advertised for are also identified. These products, which were not advertised for, are the control group. For example, "product" is just a place-holder, it may include other ways in which the brand's business breaks down. For example, it could identify services (a bank treats accounts and mortgages differently), business lines (a hardware manufacturer treats enterprise, SMB, and personal businesses differently). Finally, requirement of specifying product could be optional and omitted, but having the requirement of specifying product may provide additional control data to improve the estimates.

At operation 505, the system generates a regression model representing a relationship between the aggregate marketing data and the outcome data using Bayesian regression, where the regression model includes a time effect coefficient and the Bayesian regression is based on a prior distribution of the time effect coefficient that decays to zero as time increases. In some cases, the operations of this step may refer to, or be performed by, a regression component as described with reference to FIGS. 1 and 2.

According to an embodiment of the present disclosure, firstly, the statistical model receives a time series of the outcome (e.g. visits and page views). The model additionally breaks down these views by product and geography. Then, the model has indicator variables for whether each time point belongs to a geography where the ad was aired or not, whether the product was advertised or not, and whether the hour was such that the aggregate ad was aired during that hour or within a small window prior.

At operation 510, the system estimates a treatment effect for the marketing activity based on the regression model, where the treatment effect includes a rate of effect decay. In some cases, the operations of this step may refer to, or be performed by, an estimation component as described with reference to FIGS. 1 and 2.

According to some embodiments of the present disclosure, the regression model analyzes incremental effect of aggregate advertisement after controlling factors such as geography, time, product. In one embodiment, the Bayesian model can capture the treatment effect of the ad and provide measures of uncertainty. The treatment effect is estimated by contrasting three dimensions such as geography, time, and products. In an exemplary embodiment, the regression model can estimate decay of ad effect (i.e., how fast the effect of the ad decays). Confidence intervals may also be generated to indicate a measure of uncertainty in the estimates.

Figure 6:
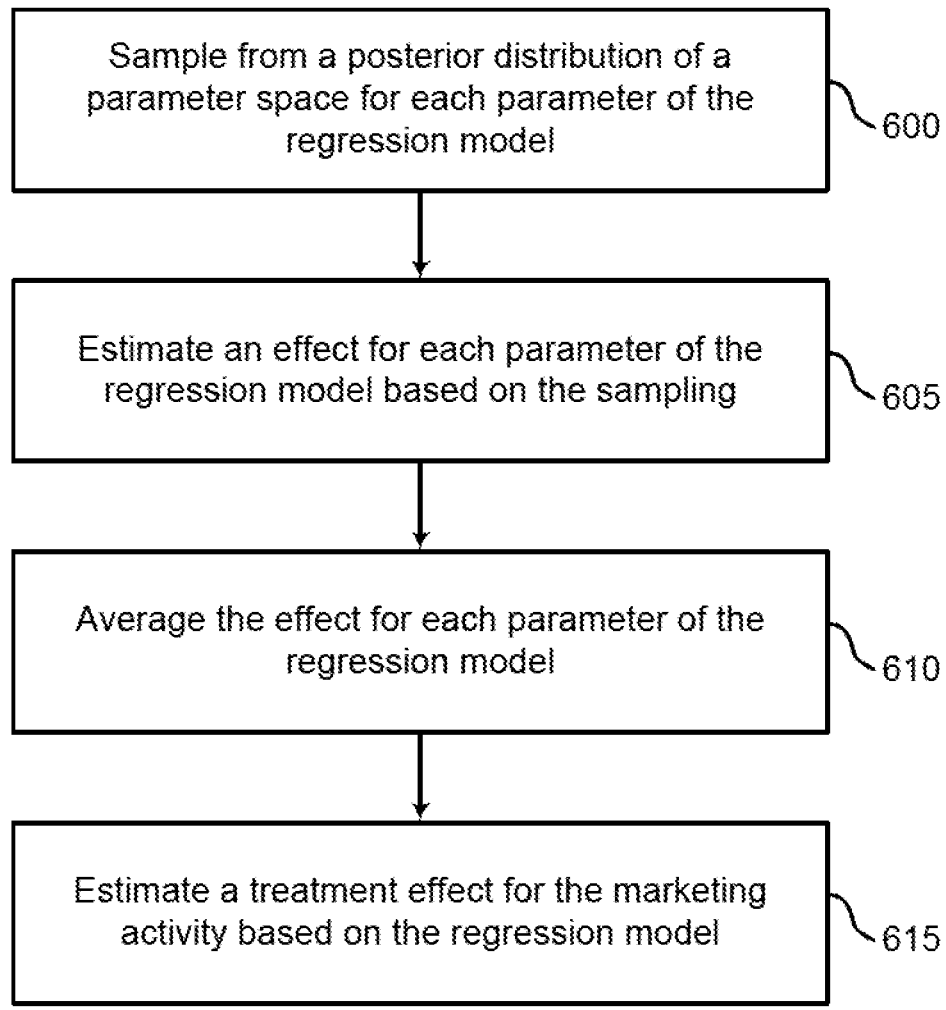
FIG. 6 shows an example of a process for estimating a treatment effect according to aspects of the present disclosure.

FIG. 6 shows an example of a process for estimating a treatment effect according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 600, the web analytics server samples from a posterior distribution of a parameter space for each parameter of the regression model. A prior distribution represents knowledge (or lack of knowledge) about various parameters in the model. A posterior distribution can be the outcome of Bayesian regression.

For example, a prior distribution that decays with respect to time may be used for a time effect coefficient. In some examples, a flat distribution is used, which is constant over a specified range. In yet another example, a normal distribution or a Student's-t distribution may be used. However, each distribution may be characterized by one or more parameters, and the parameters may be determined according to a regression process. In some cases, the operations of this step may refer to, or be performed by, a regression component as described with reference to FIGS. 1 and 2.

At operation 605, the web analytics server estimates an effect for each parameter of the regression model based on the sampling. For example, one or more of the parameters of equation 1 may be estimated (i.e., $\alpha$, $\beta_1$, $\beta_2$, $\beta_3$, $\beta_{12}$, $h_j$, $\varepsilon_{ij}$). In some cases, each of the estimates may be associated with a distribution. Thus, the parameters may be sampled from the corresponding distribution. In some cases, the operations of this step may refer to, or be performed by, a regression component as described with reference to FIGS. 1 and 2.

According to an embodiment, the Bayesian regression model uses the No-U-Turns sampling method for sampling from the posterior distribution of the parameters. One advantage of the Bayesian regression approach is to readily obtain error bounds for the parameters of interest. Additionally, it is convenient for the statistical model to generate estimate of the incremental effect of the advertisement, through sampling from the posterior distribution of parameter space, and estimating the effect from each sample, and finally averaging across these samples.

At operation 610, the web analytics server averages the effect for each parameter of the regression model. In other words, multiple samples may be taken for each of the parameters, and the results may be combined with the variables to estimate a treatment effect. The server may estimate how much changes in different parameters impact the overall treatment effect under various conditions. In some cases, the operations of this step may refer to, or be performed by, an estimation component as described with reference to FIGS. 1 and 2.

At operation 615, the web analytics server estimates a treatment effect for the marketing activity based on the regression model. In some cases, the operations of this step may refer to, or be performed by, an estimation component as described with reference to FIGS. 1 and 2.

According to some embodiments of the present disclosure, the regression model analyzes incremental effect of aggregate advertisement after controlling factors such as geography, time, product. In one embodiment, the Bayesian model can capture the treatment effect of the ad and provide measures of uncertainty. The treatment effect is estimated by contrasting three dimensions, including geography (e.g., ads aired in one of two regions), time (e.g., considering periods before and after the airing), and products (e.g., considering two sets of products, only one of which was advertised).

Figure 7:
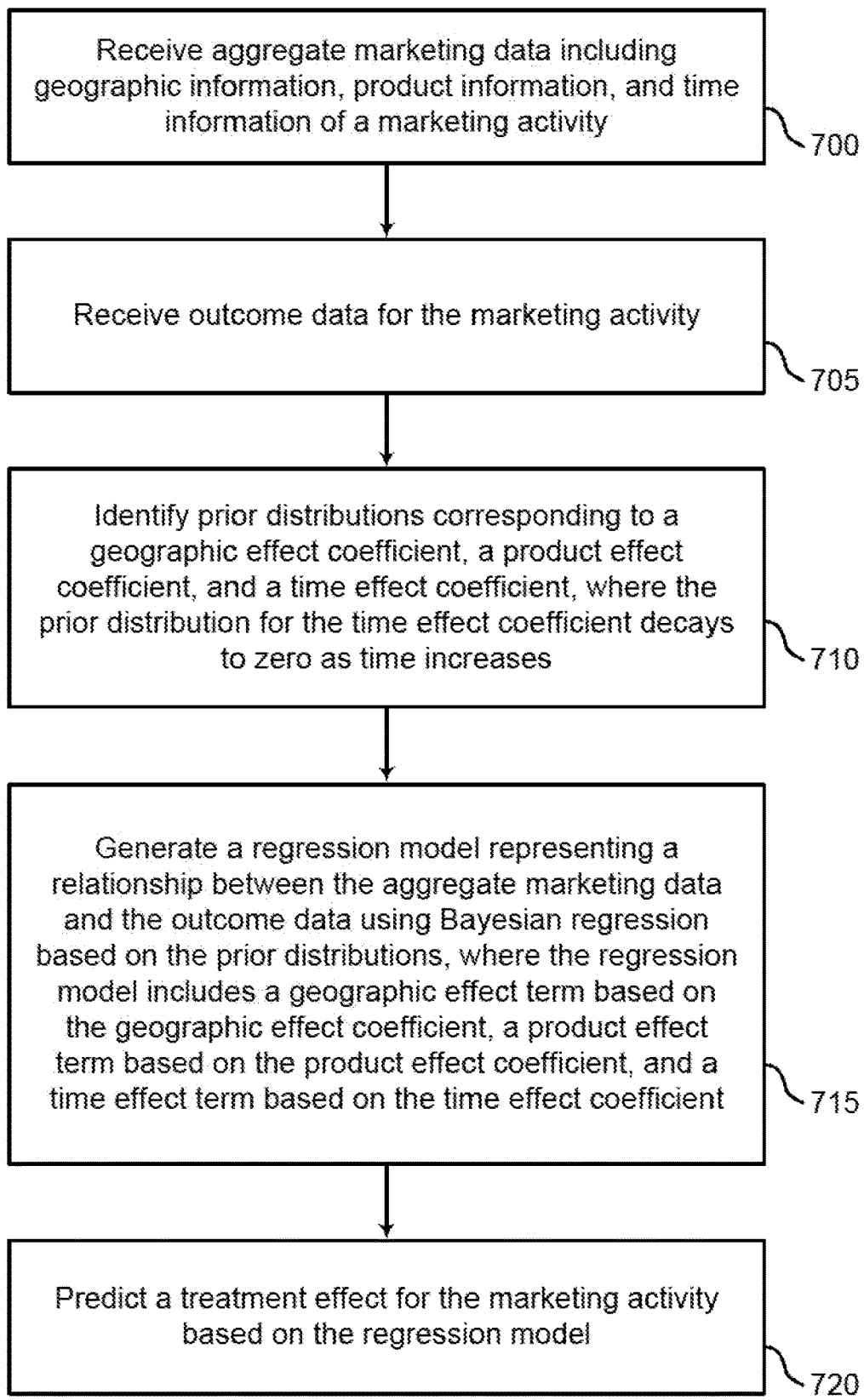
FIG. 7 shows an example of a process for data analytics according to aspects of the present disclosure.

FIG. 7 shows an example of a process for data analytics according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 700, the web analytics server receives aggregate marketing data including geographic information, product information, and time information of a marketing activity. In some cases, the operations of this step may refer to, or be performed by, a data component as described with reference to FIGS. 1 and 2.

According to an embodiment of the present disclosure, marketing attribution of aggregate advertising connects aggregate advertisement schedules and web analytics data. Aggregate marketing data includes detailed features associated with aggregate advertising (e.g., type, timing, geographic scope, etc.). One example of the aggregate marketing data is TV flighting data. The aggregate marketing data could be collected from the media wing or marketing department of a company and may be specified in an analytics tool.

According to an embodiment of the present disclosure, a regression model identifies the geographic region in which the aggregate advertisement was aired. The model additionally identifies regions in which the ad was not aired. In this way, the model is able to control across geographies.

According to an embodiment, the time period during which the ad is aired is identified. A period prior to and post the period during which the ad is aired are also analyzed. For example, one-day prior and one-day post is analyzed assuming the ad is aired only once during a three-day period.

According to an embodiment, the model also identifies which ad is associated with which product. Additionally, a similar number of products which were not advertised for are also identified. These products, which were not advertised for, are the control group. For example, "product" is just a place-holder, it may include other ways in which the brand's business breaks down. For example, it could identify services (a bank treats accounts and mortgages differently), business lines (a hardware manufacturer treats enterprise, SMB, and personal businesses differently). Finally, requirement of specifying product could be optional and omitted, but having the requirement of specifying product may provide additional control data to improve the estimates.

At operation 705, the web analytics server receives outcome data for the marketing activity. In some cases, the operations of this step may refer to, or be performed by, a data component as described with reference to FIGS. 1 and 2.

The outcome data is website or mobile analytics data which contains intended outcome of the intervention (e.g., visits, purchases, revenue). The outcome data could be collected in analytics tools such as Adobe® Analytics, and may be readily available for analysis.

At operation 710, the web analytics server identifies prior distributions corresponding to a geographic effect coefficient, a product effect coefficient, and a time effect coefficient, where the prior distribution for the time effect coefficient decays to zero as time increases.

A prior distribution represents knowledge (or lack of knowledge) about various parameters in the model. For example, a prior distribution that decays with respect to time may be used for a time effect coefficient. In some examples, a flat distribution is used, which is constant over a specified range. In yet another example, a normal distribution or a Student's-t distribution may be used. In some cases, the operations of this step may refer to, or be performed by, a distribution component as described with reference to FIGS. 1 and 2.

At operation 715, the web analytics server generates a regression model representing a relationship between the aggregate marketing data and the outcome data using Bayesian regression based on the prior distributions, where the regression model includes a geographic effect term based on the geographic effect coefficient, a product effect term based on the product effect coefficient, and a time effect term based on the time effect coefficient. In some cases, the operations of this step may refer to, or be performed by, a regression component as described with reference to FIGS. 1 and 2.

At operation 720, the web analytics server predicts a treatment effect for the marketing activity based on the regression model. In some cases, the operations of this step may refer to, or be performed by, an estimation component as described with reference to FIGS. 1 and 2.

According to some embodiments of the present disclosure, the treatment effect is estimated by contrasting three dimensions, including geography (e.g., ads aired in one of two regions), time (e.g., considering periods before and after the airing), and products (e.g., considering two sets of products, only one of which was advertised).

Embodiments of the present disclosure work well without any new private data to be collected or tracked. The regression model and methods provided are privacy friendly. The regression model is built on data that is readily available with data or website analytics tools such as Adobe® Analytics. The regression model makes inference about the effect of aggregate advertising. Thus, embodiments of the present disclosure do not need any additional data or data collection mechanism.

According to some embodiments of the present disclosure, the regression model is able to connect two disparate sources of information, i.e., aggregate advertisement schedules and web analytics data. The regression model and methods provided are readily applicable to any digital metric (e.g., orders, revenue, time spent, engagement, etc.). In addition, the present disclosure provides estimates of incremental visits at any data granularity (for example, hourly). The decay rate of effect and hence a half-life of an advertisement can be estimated.

Accordingly, the present disclosure includes at least the following embodiments.

A method for data analytics is described. Embodiments of the method include monitoring online activity corresponding to a plurality of individual users, receiving aggregate marketing data for a marketing activity, identifying online activity data for a time period corresponding to the marketing activity based on the monitoring, generating a regression model based on the aggregate marketing data and the online activity data using Bayesian regression, wherein the regression model represents a relationship between the marketing activity and the online activity, comprises a time effect coefficient, and is based on a prior distribution of the time effect coefficient that decays to zero as time increases, and estimating a treatment effect for the marketing activity on the online activity based on the regression model, wherein the treatment effect comprises a rate of effect decay.

An apparatus for data analytics is described. The apparatus includes a processor, memory in electronic communication with the processor, and instructions stored in the memory. The instructions are operable to cause the processor to monitor online activity corresponding to a plurality of individual users, receive aggregate marketing data for a marketing activity, identify online activity data for a time period corresponding to the marketing activity based on the monitoring, generate a regression model based on the aggregate marketing data and the online activity data using Bayesian regression, wherein the regression model represents a relationship between the marketing activity and the online activity, comprises a time effect coefficient, and is based on a prior distribution of the time effect coefficient that decays to zero as time increases, and estimate a treatment effect for the marketing activity on the online activity based on the regression model, wherein the treatment effect comprises a rate of effect decay.

A non-transitory computer readable medium storing code for data analytics is described. In some examples, the code comprises instructions executable by a processor to: monitor online activity corresponding to a plurality of individual users, receive aggregate marketing data for a marketing activity, identify online activity data for a time period corresponding to the marketing activity based on the monitoring, generate a regression model based on the aggregate marketing data and the online activity data using Bayesian regression, wherein the regression model represents a relationship between the marketing activity and the online activity, comprises a time effect coefficient and is based on a prior distribution of the time effect coefficient that decays to zero as time increases, and estimate a treatment effect for the marketing activity on the online activity based on the regression model, wherein the treatment effect comprises a rate of effect decay.

Some examples of the method, apparatus, and non-transitory computer readable medium described above further include identifying a first time period occurring before the marketing activity. Some examples further include identifying a second time period occurring after the marketing activity. Some examples further include collecting the online activity data for the first time period and the second time period, wherein the time period comprises the first time period and the second time period. Some examples of the method, apparatus, and non-transitory computer readable medium described above further include identifying an impacted geographic region for the marketing activity.

Some examples further include identifying a control region. Some examples further include collecting the online activity data for the impacted geographic region and the control region, wherein the regression model comprises a geographic effect coefficient. Some examples of the method, apparatus, and non-transitory computer readable medium described above further include identifying a product associated with the marketing activity. Some examples further include identifying a control product. Some examples further include collecting the online activity data for the product and the control product, wherein the regression model comprises a product effect coefficient.

Some examples of the method, apparatus, and non-transitory computer readable medium described above further include sampling from a posterior distribution of a parameter space for each parameter of the regression model. Some examples further include estimating an effect for each parameter of the regression model based on the sampling. Some examples further include averaging the effect for each parameter of the regression model, wherein the treatment effect is based on the averaging. Some examples of the method, apparatus, and non-transitory computer readable medium described above further include identifying the prior distribution of the time effect coefficient, where the prior distribution of the time effect coefficient comprises an exponential distribution. Some examples of the method, apparatus, and non-transitory computer readable medium described above further include identifying a Student's t-distribution, wherein the regression model comprises an intercept term based on the Student's t-distribution.

Some examples of the method, apparatus, and non-transitory computer readable medium described above further include identifying a normal prior distribution, wherein the regression model comprises a seasonality term based on the normal prior distribution. Some examples of the method, apparatus, and non-transitory computer readable medium described above further include identifying a normal distribution based on a correlation matrix having an auto regressive structure of degree 1, wherein the regression model comprises an error term based on the normal distribution.

In some examples, the regression model is based on a plurality of variance terms, wherein each of the variance terms is based on a Student's t-distribution. In some examples, a geographic effect coefficient, a product effect coefficient, and a geography-product interaction coefficient of the regression model are each based on a flat prior distribution. In some examples, the Bayesian regression is based on a No-U-Turns sampling method for sampling from posterior parameter distributions. In some examples, the prior distribution of the time effect coefficient decays after a threshold time following the marketing activity.

Some examples of the method, apparatus, and non-transitory computer readable medium described above further include airing a TV advertisement, wherein the aggregate marketing data comprises data about the TV advertisement. Some examples of the method, apparatus, and non-transitory computer readable medium described above further include collecting analytics data for a website or a web-based application, wherein the online activity data comprises the analytics data.

Some examples of the method, apparatus, and non-transitory computer readable medium described above further include providing an uncertainty measure for at least one estimated parameter of the regression model.

A method for data analytics is described. Embodiments of the method include receiving aggregate marketing data comprising geographic information, product information, and time information of a marketing activity, receiving outcome data for the marketing activity, identifying prior distributions corresponding to a geographic effect coefficient, a product effect coefficient, and a time effect coefficient, wherein the prior distribution for the time effect coefficient decays to zero as time increases, generating a regression model representing a relationship between the aggregate marketing data and the outcome data using Bayesian regression based on the prior distributions, wherein the regression model comprises a geographic effect term based on the geographic effect coefficient, a product effect term based on the product effect coefficient, and a time effect term based on the time effect coefficient, and predicting a treatment effect for the marketing activity based on the regression model.

An apparatus for data analytics is described. The apparatus includes a processor, memory in electronic communication with the processor, and instructions stored in the memory. The instructions are operable to cause the processor to receive aggregate marketing data comprising geographic information, product information, and time information of a marketing activity, receive outcome data for the marketing activity, identify prior distributions corresponding to a geographic effect coefficient, a product effect coefficient, and a time effect coefficient, wherein the prior distribution for the time effect coefficient decays to zero as time increases, generate a regression model representing a relationship between the aggregate marketing data and the outcome data using Bayesian regression based on the prior distributions, wherein the regression model comprises a geographic effect term based on the geographic effect coefficient, a product effect term based on the product effect coefficient, and a time effect term based on the time effect coefficient, and predict a treatment effect for the marketing activity based on the regression model.

A non-transitory computer readable medium storing code for data analytics is described. In some examples, the code comprises instructions executable by a processor to: receive aggregate marketing data comprising geographic information, product information, and time information of a marketing activity, receive outcome data for the marketing activity, identify prior distributions corresponding to a geographic effect coefficient, a product effect coefficient, and a time effect coefficient, wherein the prior distribution for the time effect coefficient decays to zero as time increases, generate a regression model representing a relationship between the aggregate marketing data and the outcome data using Bayesian regression based on the prior distributions, wherein the regression model comprises a geographic effect term based on the geographic effect coefficient, a product effect term based on the product effect coefficient, and a time effect term based on the time effect coefficient, and predict a treatment effect for the marketing activity based on the regression model.

In some examples, the regression model further comprises a geography-product interaction term, an intercept term, a seasonality term, and an error term.

An apparatus for data analytics is described. Embodiments of the apparatus include a data component configured to receive aggregate marketing data and outcome data for a marketing activity, a regression component configured to generate a regression model using Bayesian regression based on the aggregate marketing data and the outcome data and further based on a prior distribution of a time effect coefficient that decays to zero as time increases, and an estimation component configured to estimate a treatment effect for the marketing activity based on the regression model, wherein the estimated treatment effect comprises a rate of effect decay.

A method of providing an apparatus for data analytics is described. The method includes a data component configured to receive aggregate marketing data and outcome data for a marketing activity, a regression component configured to generate a regression model using Bayesian regression based on the aggregate marketing data and the outcome data and further based on a prior distribution of a time effect coefficient that decays to zero as time increases, and an estimation component configured to estimate a treatment effect for the marketing activity based on the regression model, wherein the estimated treatment effect comprises a rate of effect decay.

Some examples of the apparatus and method described above further include a distribution component configured to identify a prior distribution for each of a plurality of coefficients of the regression model.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A computer-implemented method for data analytics, comprising:
    training, by a processor, an artificial neural network to model a relationship between a marketing activity and an online activity;
    receiving, by the processor, first aggregate marketing data during a first time period prior to the marketing activity, wherein the first aggregate marketing data includes information about a set of products featured in offline advertising and does not include information about individual users;
    identifying, by the processor, a product in the set of products featured in the offline advertising and having online activity data available for the online activity;
    selecting, by the processor, a control product based on the control product not being in the set of products featured in the offline advertising and having the online activity data available;
    collecting, by the processor, the online activity data for the product and the control product during a time period corresponding to the marketing activity, wherein the online activity data includes the information about the individual users;
    determining, by the processor, a prior distribution corresponding to a product effect coefficient based at least in part on the online activity data for the product and the control product;
    generating, by the processor using the artificial neural network, a regression model that includes the product effect coefficient based on the prior distribution, wherein the regression model represents the relationship between the marketing activity and the online activity;
    estimating, by the processor, a treatment effect for the marketing activity on the online activity based on the regression model;
    receiving, by the processor, second aggregate marketing data during a second time period after the marketing activity; and
    updating, by the processor, the artificial neural network based on the second aggregate marketing data.

2. The computer-implemented method of claim 1, further comprising:
    collecting the online activity data for the first time period and the second time period, wherein the time period comprises the first time period and the second time period.

3. The computer-implemented method of claim 1, further comprising:
    identifying an impacted geographic region for the marketing activity;
    identifying a control region; and
    collecting the online activity data for the impacted geographic region and the control region, wherein the regression model comprises a geographic effect coefficient.

4. The computer-implemented method of claim 1, further comprising:
    sampling from a posterior distribution of a parameter space for each parameter of the regression model;
    estimating an effect for the each parameter of the regression model based on the sampling; and
    averaging the effect for the each parameter of the regression model, wherein the treatment effect is based on the averaging.

5. The computer-implemented method of claim 1, further comprising:
    identifying a prior distribution of a time effect coefficient that decays to zero as time increases, wherein the regression model is based on the prior distribution of the time effect coefficient.

6. The computer-implemented method of claim 5, wherein:
    the prior distribution of the time effect coefficient decays after a threshold time following the marketing activity.

7. The computer-implemented method of claim 1, further comprising: identifying a Student's t-distribution, wherein the regression model comprises an intercept term based on the Student's t-distribution.

8. The computer-implemented method of claim 1, further comprising:
   identifying a normal prior distribution, wherein the regression model comprises a seasonality term based on the normal prior distribution.

9. The computer-implemented method of claim 1, further comprising:
   identifying a normal distribution based on a correlation matrix having an auto regressive structure of degree 1, wherein the regression model comprises an error term based on the normal distribution.

10. The computer-implemented method of claim 1, wherein:
    the regression model is based on a plurality of variance terms, wherein each of the plurality of variance terms is based on a Student's t-distribution.

11. The computer-implemented method of claim 1, wherein:
    a geographic effect coefficient, the product effect coefficient, and a geography-product interaction coefficient of the regression model are each based on a flat prior distribution.

12. The computer-implemented method of claim 1, wherein:
    the regression model is generated using a Bayesian regression based on a No-U-Turns sampling method for sampling from posterior parameter distributions.

13. The computer-implemented method of claim 1, further comprising:
    providing an uncertainty measure for at least one estimated parameter of the regression model.

* * * * *